Sept. 29, 1936. A. H. HANNON 2,055,745
STRAIGHT LINE ELECTROPLATING MACHINE
Filed March 7, 1933 5 Sheets-Sheet 1
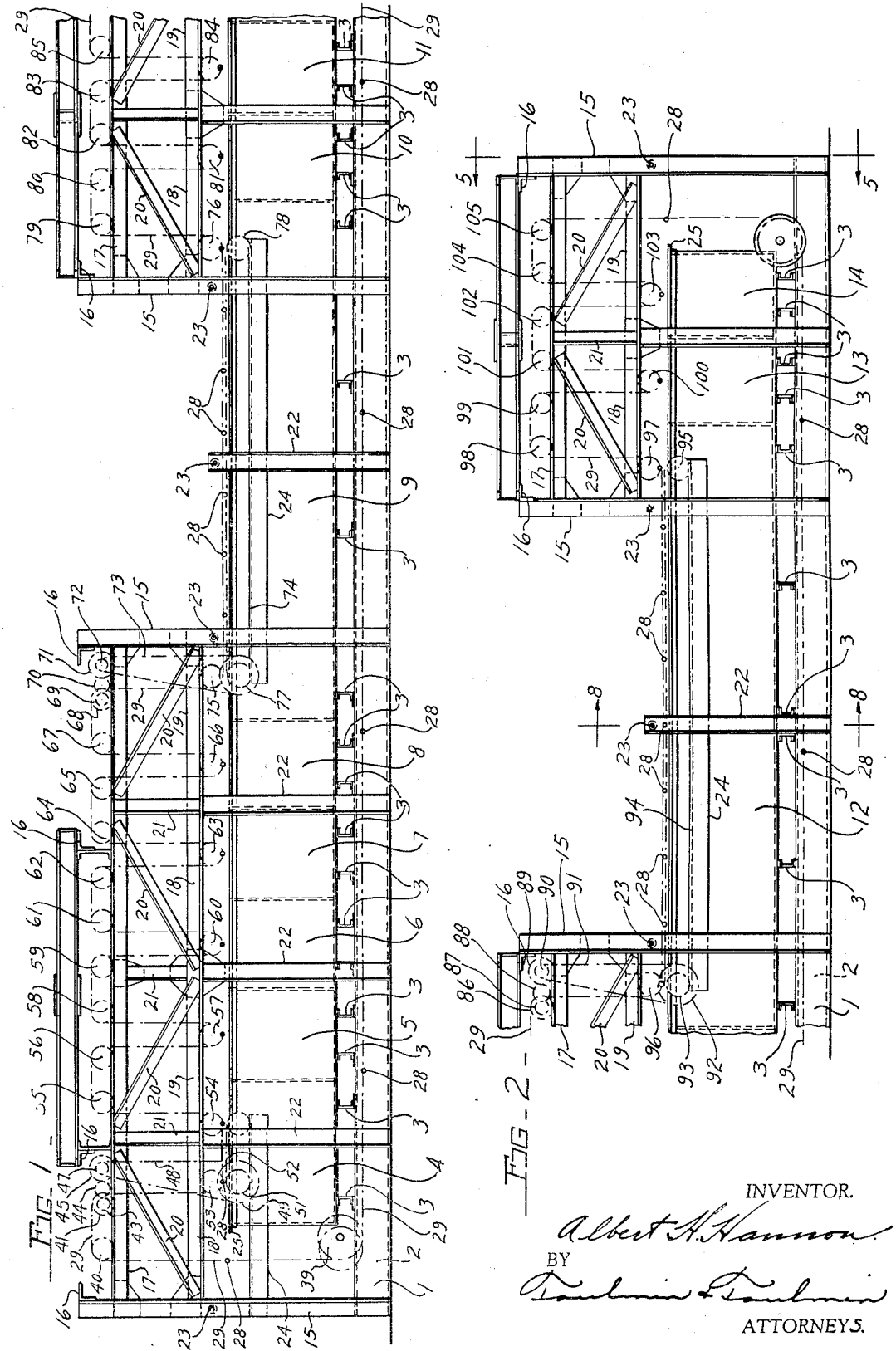
INVENTOR.
Albert H. Hannon
BY
Toulmin & Toulmin
ATTORNEYS.

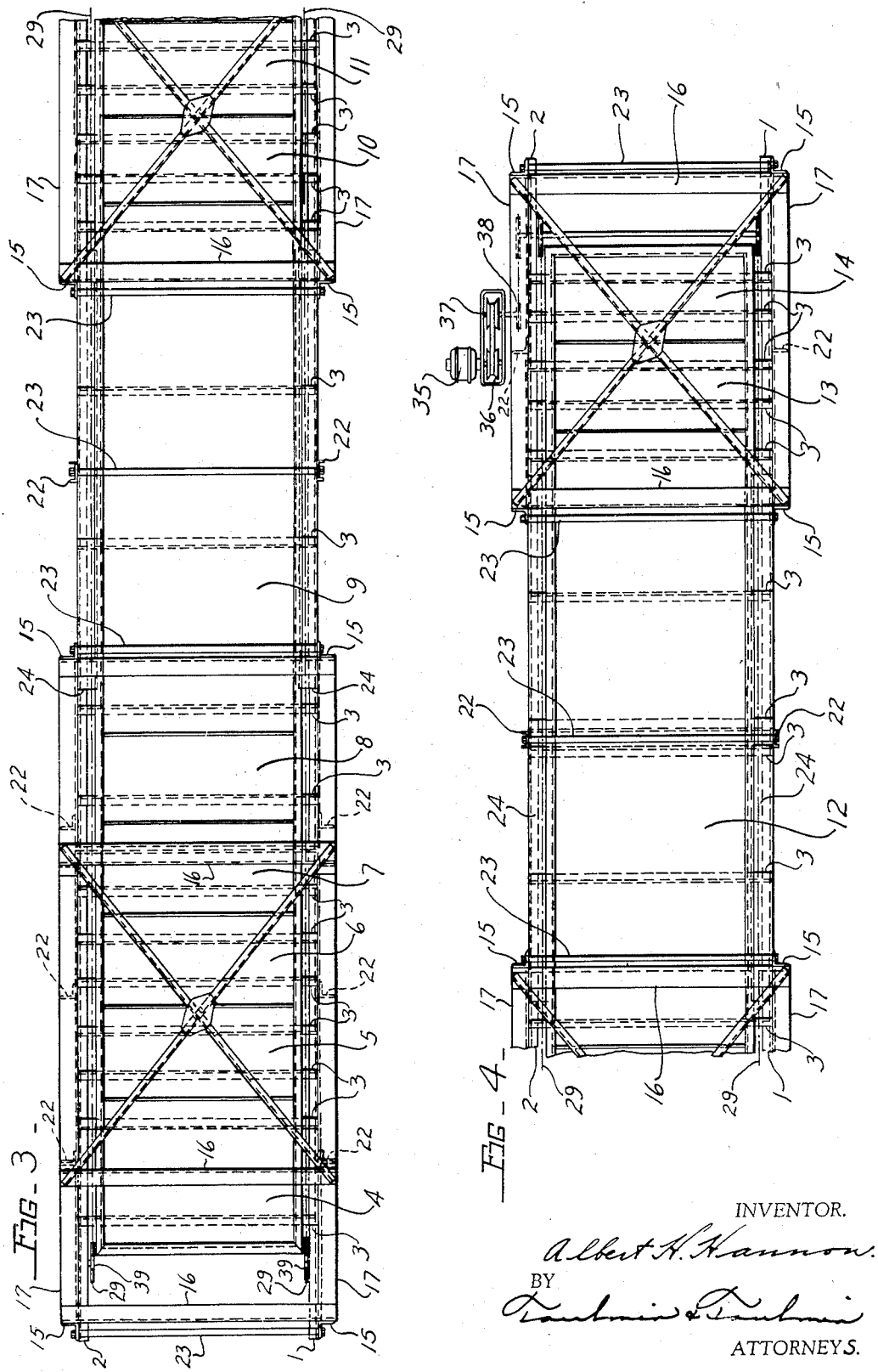

INVENTOR.
Albert H. Hannon.
BY
ATTORNEYS

Sept. 29, 1936.  A. H. HANNON  2,055,745
STRAIGHT LINE ELECTROPLATING MACHINE
Filed March 7, 1933  5 Sheets-Sheet 4
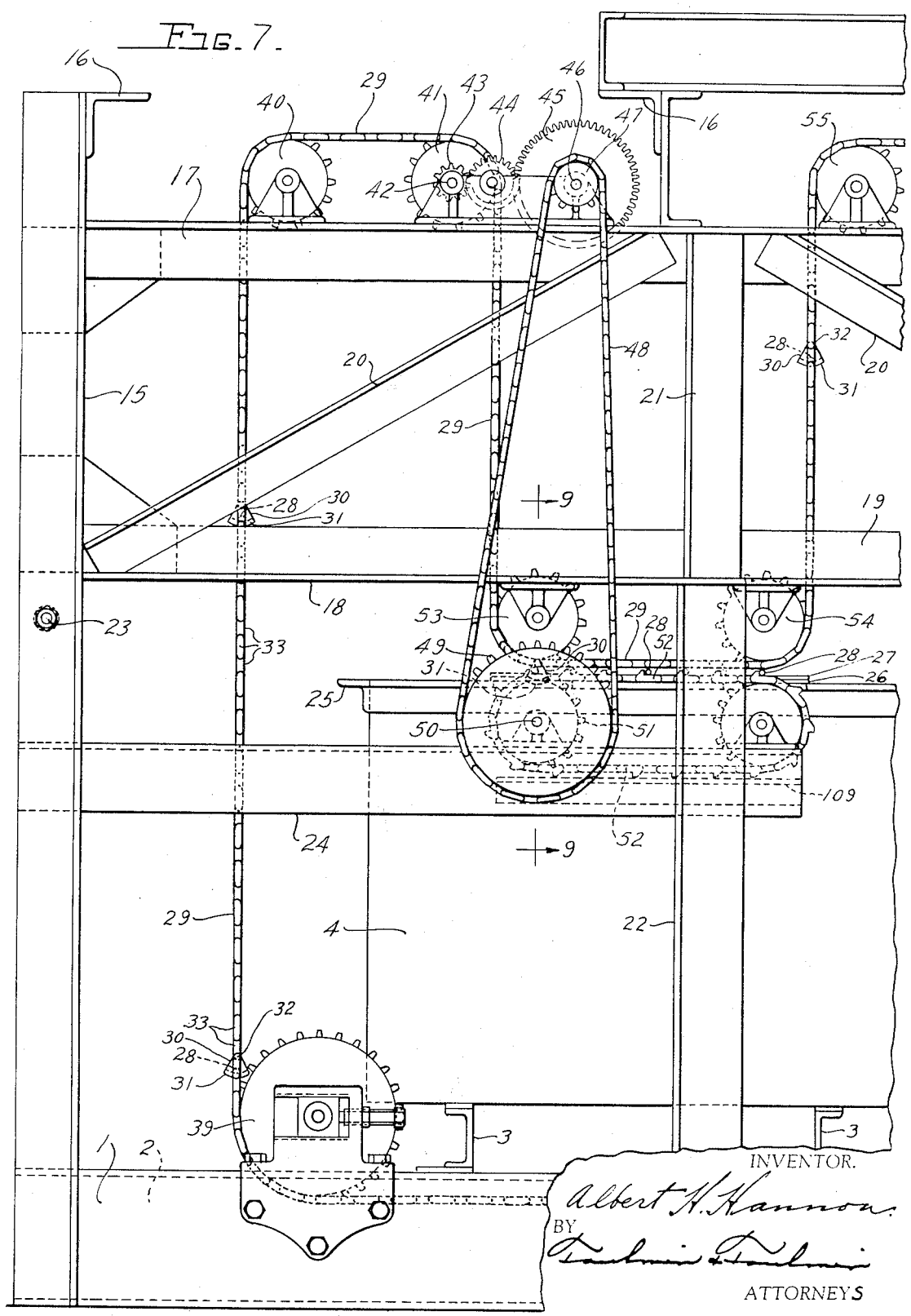

Sept. 29, 1936.    A. H. HANNON    2,055,745
STRAIGHT LINE ELECTROPLATING MACHINE
Filed March 7, 1933    5 Sheets-Sheet 5
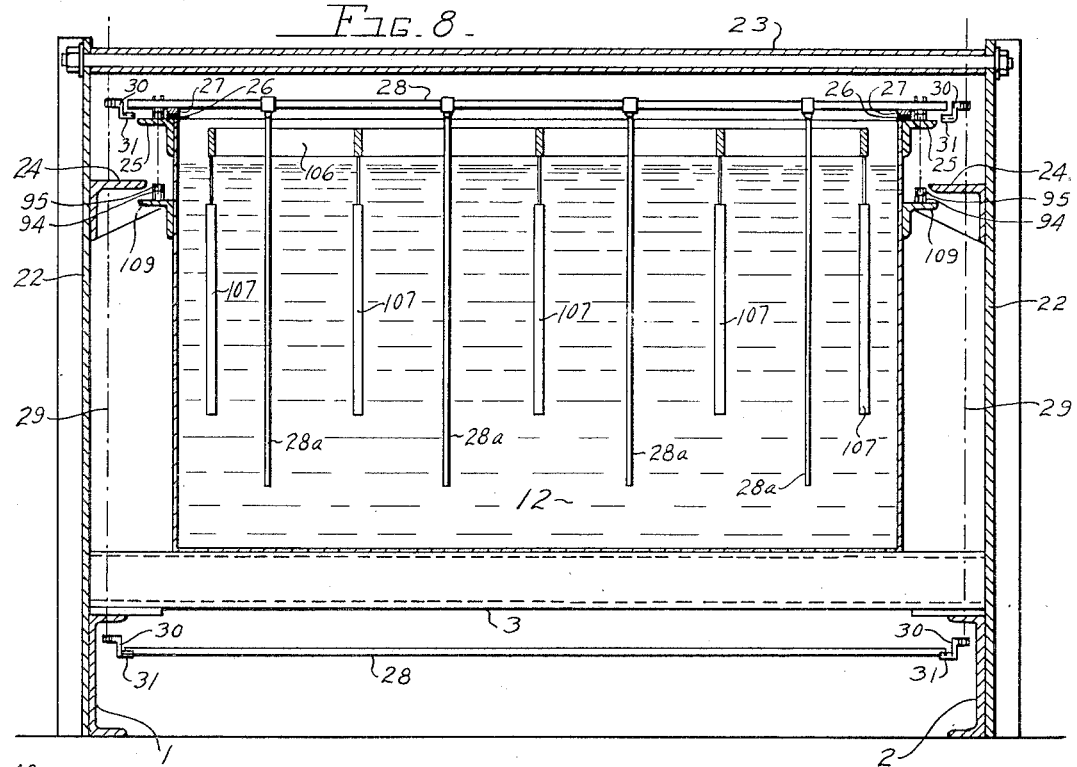
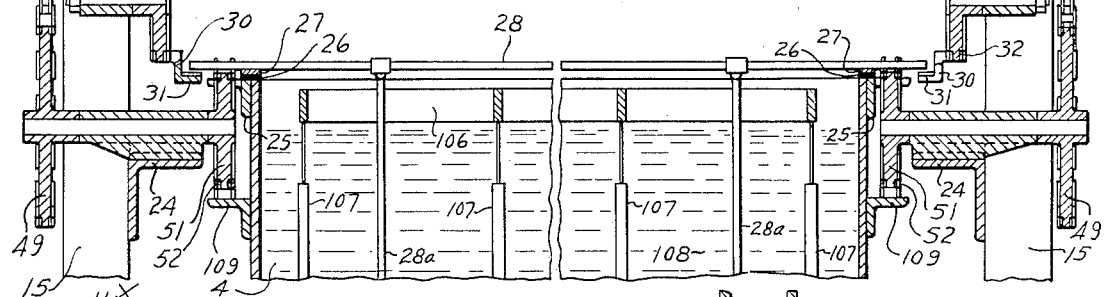
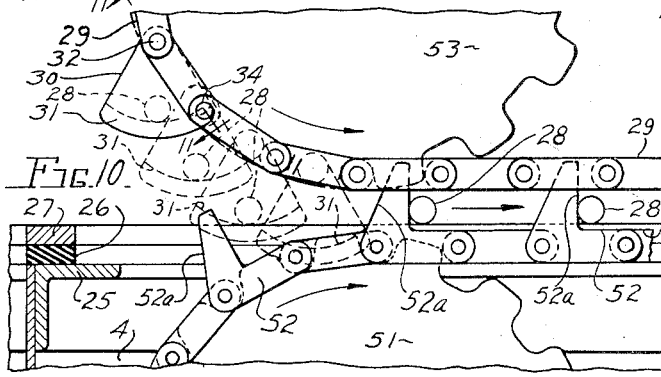
INVENTOR.
Albert H. Hannon.
BY
ATTORNEYS Patented Sept. 29, 1936

2,055,745

UNITED STATES PATENT OFFICE 2,055,745

STRAIGHT LINE ELECTROPLATING MACHINE

Albert H. Hannon, Springfield, Ohio

Application March 7, 1933, Serial No. 659,932

9 Claims. (Cl. 204—5)

My invention relates to machines for conveying and intermittently dipping articles of manufacture and in particular relates to electroplating machines for this purpose.

It is an object to provide a machine in which the major carrier travels at a predetermined relatively high rate of speed while there are a plurality of minor carriers travelling at a relatively slow rate of speed which are adapted to convey the supports and their articles through the solutions while the major carrier carries the supports and their articles from one solution to another. This is desirable due to the fact that the minimum time for oxidation should be provided in conveying articles from one tank to another and the maximum time in the tank.

It is a further object to provide an arrangement whereby relatively few rods per foot of the major carrier are transported as compared to the number of rods per foot of the minor carrier.

A simple means of transfer from the major carrier to the minor carrier and from the minor carrier to the major carrier is provided while at the same time providing for an electric circuit which is completed when the articles are mounted upon and carried by the minor carrier.

It is a further object to provide a machine comprising a simple framework of angle iron, tanks and two chain systems comprising the major and minor carriers so as to insure the utmost simplicity and corresponding cheapness in the manufacture of a machine of this character.

It is a further object to provide loading and unloading stations, the material being loaded and unloaded without stopping the major carrier.

It is a further object to provide a common driving motor which may be either continuously or intermittently operated, preferably the latter, for driving both the major and minor carriers. It is therefore possible to permit the major carrier to stop for loading and unloading and at the same time bring to rest the articles carried by the minor carriers while they are in the electroplating tanks to secure the corresponding advantages of plating while the articles are at rest and also moving them through the tank of electroplating material for a portion of the period of their immersion to free them from accumulated hydrogen bubbles.

Referring to the drawings, Figure 1 is a side elevation of the left hand end of the machine.

Figure 2 is a side elevation of the right hand end of the machine.

Figure 3 is a top plan view of Figure 1.

Figure 4 is a top plan view of Figure 2.

Figure 7 is a detailed side elevation of one end of the machine showing the relationship between the two carriers, the method of driving the two carriers in unison, and the like.

Figure 8 is a section on the line 8—8 of Figure 2.

Figure 9 is a section on the line 9—9 of Figure 7.

Figure 10 is a view similar to Figure 6 showing the delivery of a rod with its supported articles from the major carrier to the minor carrier.

Figure 11 is a section on the line 11—11 of Figure 10.

Figure 12 is a detailed view of one of the pivoted supports for the rods on the major carrier.

Figure 5:
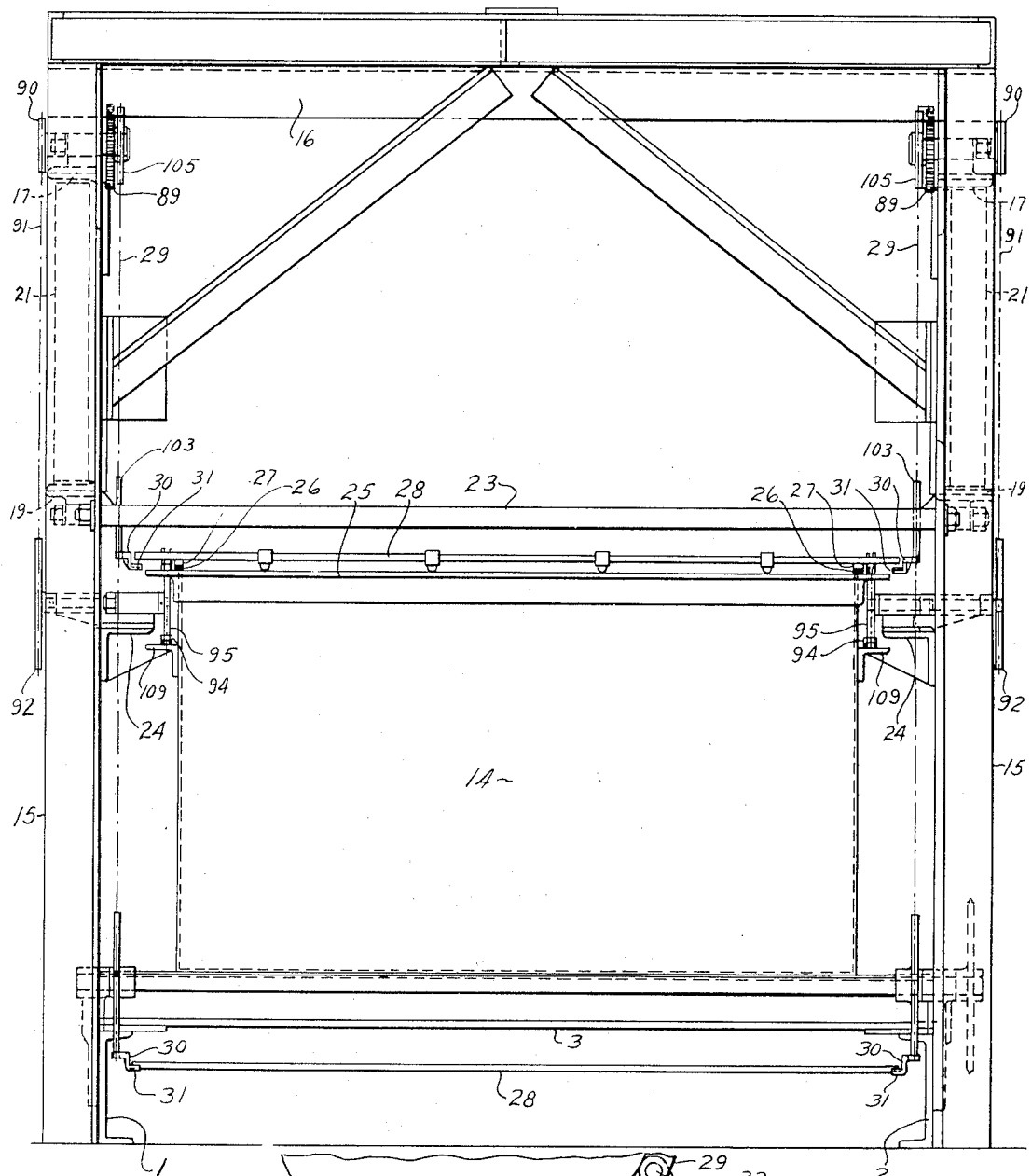
Figure 5 is a section on the line 5—5 of Figure 2.

Referring to the drawings in detail, 1 and 2 indicate longitudinally extending channel irons U shape in section forming the longitudinal foundation members for the machine. Mounted on these members and arranged transversely thereof is a plurality of channel irons 3 which tie the side members 1 and 2 together and likewise act as supports for the tank structure.

Reading from left to right in Figures 1 and 2, the tank structure comprises the electro-cleaner tank 4, the cold water tank 5, acid tank 6, cold water tank 7, cold water tank 8, the copper plating tank 9, cold water tank 10, cold water tank 11, the nickel tank 12, cold water tank 13 and hot water tank 14.

The exact arrangement and order of the tanks for the purpose for which they are used are not important as this will vary according to the pickling or other operations performed, such as cleaning, washing, etc.

The superstructure is comprised of the upright angle irons 15 which extend from the base of the foundation rails 1 or 2 upwardly to a point above the tanks where they are joined together transversely by the members 16 and longitudinally by the members 17. They are also joined together longitudinally by the spacer members 18 and 19 which are interconnected by the diagonal member 20 and vertical members 21. Suitable reinforcing gusset plates are utilized to connect these several members one to the other.

Between the uprights 15 there is joined to the longitudinal member 19 a vertical tie frame member 22. Such tie members 22 at other points than adjacent the superstructure are interconnected by tie rods 23. The vertical members 15 and 22 carry horizontal angle iron side rails 24 for the minor carrier chains as hereinafter described.

The tanks are provided with angle iron flanges 25 on which are mounted insulation strips 26 and contact plates 27 which receive the carrier rods 28.

The major carrier comprises the spaced chains 29 on which are mounted a plurality of arcuate pivoted brackets 30 (Figures 11 and 12) having swinging arcuate hands 31 and pivots 32. The pivot 32 acts as the pivot connecting the links 33 of the chain 29. Such pivots occur at stated intervals while the remainder of the links are connected by the short pivots 34.

The main carrier chain 29 is driven either continuously or intermittently by the motor 35 through a suitable speed reducing mechanism 36 which is connected to the main driving shaft 37 on which are mounted the driving sprockets 38. The chain travels from the unloading position at the right hand of the machine downwardly and between the foundation rails 1 and 2 until it reaches the extreme left hand position where it passes over the sprockets 39 and thence upwardly to the position where it is loaded with the rods which carry the articles. It then passes upwardly over the sprocket 40, over the sprocket 41, the shaft of which at 42 carries a pinion 43 meshing with an intermediate gear 44 that operates the gear 45 on the shaft 46. This shaft 46 carries the sprocket 47 that carries the chain 48. The chain 48 drives the large sprocket 49 on the shaft 50 which carries the sprocket 51, that in turn drives the minor chain 52.

The major chain 29 passes downwardly over the sprocket 53 and thence proceeds in parallel relationship with the top of the chain 52 for a distance (Figures 1 and 7), when it again passes upwardly over the sprocket 54. It continues this operation by passing over the sprocket 55, thence horizontally to the sprocket 56, downwardly under the sprocket 57, up and over the sprocket 58, horizontally to the sprocket 59, downwardly beneath the sprocket 60, upwardly and over the sprocket 61, horizontally to the sprocket 62, downwardly beneath the sprocket 63, upwardly over the sprocket 64, horizontally over the sprocket 65, downwardly under the sprocket 66, upwardly over the sprocket 67, horizontally over the sprocket 68, which is provided with a gear 69 meshing with an intermediate gear 70 that drives the gear 71, the sprocket 72 and the chain 73, which in turn drives the second minor chain 74. The major 29 passes downwardly over the sprocket 68, beneath the sprocket 75 and thence in parallelism with the top of the chain 74 until it passes upwardly beneath the sprocket 76. The minor chain in the meantime has been passing over the sprockets 77 and 78. The sprocket 77 is driven by the chain 73.

The major chain then passes upwardly over the sprocket 79, thence horizontally over the sprocket 80, downwardly beneath the sprocket 81, upwardly over the sprocket 82, horizontally over the sprocket 83, downwardly under the sprocket 84, thence upwardly over the sprocket 85 and horizontally over the sprocket 86, which carries the gear 87 driving the intermediate gear 88, which in turn drives the gear 89 that carries the sprocket 90 driving the chain 91 which drives the sprocket 92 that is connected to the sprocket 93 driving the third minor chain 94, the other end of which is supported on the end of the sprocket 95.

The major chain 29 passes downwardly over the sprocket 86, beneath the sprocket 96 and thence in parallelism with the top of the chain 94 until it passes beneath the sprocket 97 and thence upwardly over the sprocket 98, horizontally over the sprocket 99, downwardly beneath the sprocket 100, upwardly over the sprocket 101, horizontally over the sprocket 102, downwardly beneath the sprocket 103, upwardly over the sprocket 104, horizontally over the sprocket 105 and downwardly to the unloading mechanism.

Figure 6:
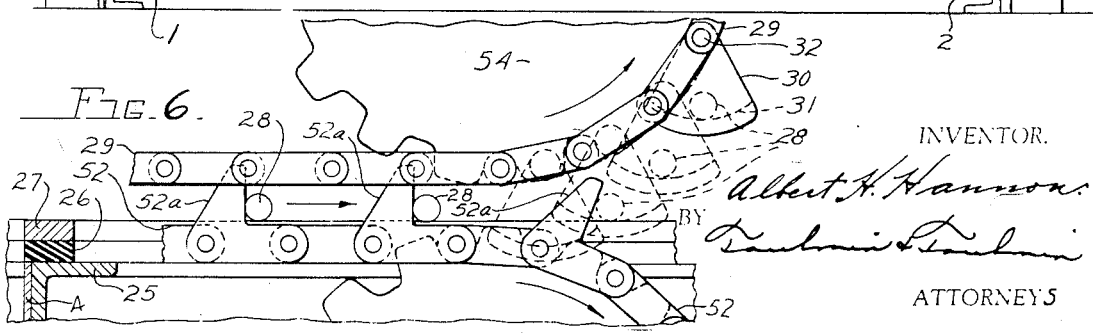
Figure 6 is a detailed elevation of the juncture area of the major and minor carriers and the mechanism for the transfer of rods supporting the aticles to be electroplated from one carrier to the other.

It will be noted, turning to Figures 10 and 6, which respectively show the unloading from the major carrier to the minor carrier and loading from the minor carrier to the major carrier, that the swinging support 31 which carries the ends of the rods 28, passes to one side of but below the top of the contact plates 27 of the flanges 25 on the tank upon which the rod is deposited and allowed to rest.

The major chain then passes on with its carrier 30 but at this point the minor carrier chain 52 which has the lugs 52a picks up the rod and slides it along the contact plates 27, carrying with it the suspended articles 28a.

It will be noted that by the minor chain 52 travelling at a slower speed than the major chain 29 more rods 28 will be deposited on the minor chain per foot of chain than carried on the major chain. This enables a large number of articles to be treated in a tank, enables these articles to be suspended stationarily within the tank when the chains are at rest and moved slowly through the tank when the chains are in motion while the major chain travelling at a higher speed, has the rods spaced further apart, which facilitates loading and unloading.

The frame 106 carries the cathodes 107, completing the circuit through the solution, which is indicated at 108.

It will be noted that the side rails 109 on the tanks act as supports and guides for the minor or secondary chain such as 52.

It will be understood that I desire to comprehend within my invention such modifications as may be clearly embraced within the scope of my claims and invention.

Having thus fully described my invention, what I claim as new and desire to secure by Letters Patent, is:

1. In a plating machine having a plurality of tanks, a major carrier comprising a spaced pair of major conveyor chains, each positioned in a portion of its length to travel in an undulating path toward and away from each successive tank, means to carry articles between said chains from one tank to the other, a minor carrier comprising a pair of spaced minor conveyor chains associated with each tank for moving articles to be plated through the tank, and means on said carriers for transferring articles from one carrier to the other, said carriers being adapted to travel in parallel relationship during the transfer portion of their length.

2. In a plating machine having a plurality of tanks, a major carrier comprising a spaced pair of major conveyor chains, each positioned in a portion of its length to travel in an undulating path toward and away from each successive tank, means to carry articles between said chains from one tank to the other, a minor carrier comprising a pair of spaced minor conveyor chains associated with each tank for moving articles to be plated through the tank, means on said carriers for transferring articles from one carrier to the other, said carriers being adapted to travel in parallel relationship during the transfer portion of their length, and means for synchronizing and driving one carrier from the other.

3. In a plating machine having a plurality of tanks, a major carrier comprising a spaced pair of major conveyor chains, each positioned in a portion of its length to travel in an undulating path toward and away from each successive tank, means to carry articles between said chains from one tank to the other, a minor carrier, comprising a pair of spaced minor conveyor chains associated with each tank for moving articles to be plated through the tank, means on said carriers for transferring articles from one carrier to the other, said carriers being adapted to travel in parallel relationship during the transfer portion of their length, means for synchronizing and driving one carrier from the other, and a common driving means for said carriers.

4. In combination, a base frame, a tank structure, an overhead frame, a major carrier comprising a pair of spaced chains supported on said frame, means to guide the major carrier chains beneath said tank structure adjacent the base frame, thence over said overhead frames and toward and away from said tank structure at spaced intervals in a crenellated path, means adjacent the top of the tank structure for guiding a part of the crenellated portion of the major carrier parallel to the top of the tank structure, a minor carrier comprising a pair of spaced conveyor chains drivingly connected to said major carrier with the upper portion of the minor carrier arranged to travel horizontally adjacent the top of the tank structure, and means of transferring articles from one carrier to the other, said minor carrier being arranged to transport the articles in a horizontal path during their suspension within the tank and said major carrier being arranged to support the articles during the remainder of their travel.

5. In an electroplating machine, a plurality of tanks separated by partitions, work supports for supporting articles to be treated, a pair of spaced minor conveyor chains arranged to move articles to be treated through one of said tanks, a pair of spaced major conveyor chains positioned adjacent said partitions to travel in undulating paths to convey said work supports over said partitions, said major conveyor chains being arranged to move horizontally adjacent to said minor conveyor chains, and work support holders on said major conveyor chains arranged to deposit said work supports in positions to be engaged and conveyed by said minor conveyor chains and to pick up said work supports after such conveyance.

6. In an electroplating machine, a plurality of tanks separated by partitions, work supports for supporting articles to be treated, a pair of spaced minor conveyor chains arranged to move articles to be treated through one of said tanks, a pair of spaced major conveyor chains positioned adjacent said partitions to travel in undulating paths to convey said work supports over said partitions, said major conveyor chains being arranged to move horizontally adjacent to said minor conveyor chains, work support holders on said major conveyor chains arranged to deposit said work supports in positions to be engaged and conveyed by said minor conveyor chains and to pick up said work supports after such conveyance, and driving members associated with said minor conveyor chains for urging said deposited work supports horizontally after they are deposited by said work support holders.

7. In an electroplating machine, a plurality of tanks separated by partitions, work supports for supporting articles to be treated, a pair of spaced minor conveyor chains arranged to move articles to be treated through one of said tanks, a pair of spaced major conveyor chains positioned adjacent said partitions to travel in undulating paths to convey said work supports over said partitions, said major conveyor chains being arranged to move horizontally adjacent to said minor conveyor chains, work support holders on said major conveyor chains arranged to deposit said work supports in positions to be engaged and conveyed by said minor conveyor chains and to pick up said work supports after such conveyance, and guide members adapted to receive and guide the work supports deposited thereon from said holders.

8. In an electroplating machine, a plurality of tanks separated by partitions, work supports for supporting articles to be treated, a pair of spaced minor conveyor chains arranged to move articles to be treated through one of said tanks, a pair of spaced major conveyor chains positioned adjacent said partitions to travel in undulating paths to convey said work supports over said partitions, said major conveyor chains being arranged to move horizontally adjacent to said minor conveyor chains, work support holders on said major conveyor chains arranged to deposit said work supports in positions to be engaged and conveyed by said minor conveyor chains and to pick up said work supports after such conveyance, driving members associated with said minor conveyor chains for urging said deposited work supports horizontally after they are deposited by said work support holders, and guide members adapted to receive and guide the work supports deposited thereon from said holders.

9. In an electroplating machine, a plurality of tanks separated by partitions, work supports for supporting articles to be treated, a pair of spaced minor conveyor chains arranged to move articles to be treated through one of said tanks, a pair of spaced major conveyor chains positioned adjacent said partitions to travel in undulating paths to convey said work supports over said partitions, said major conveyor chains being arranged to move horizontally adjacent to said minor conveyor chains, work support holders on said major conveyor chains arranged to deposit said work supports in positions to be engaged and conveyed by said minor conveyor chains and to pick up said work supports after such conveyance, driving members associated with said minor conveyor chains for urging said deposited work supports horizontally after they are deposited by said work support holders, and guide members adapted to receive and guide the work supports deposited thereon from said holders, said major and minor conveyor chains being arranged to approach one another sufficiently to cause said work support holders to pass beneath the level of said guide members, whereby to deposit said work supports at one end of said guide members and pick up said work supports at the other end thereof.

ALBERT H. HANNON.